US012808394B2

(12) United States Patent
Bueter

(10) Patent No.: US 12,808,394 B2
(45) Date of Patent: Nov. 24, 2026

(54) WORKING CYLINDER WITH PRESSURE MEDIUM OVERFLOW

(71) Applicant: Bümach Engineering International B. V., TA Emmen (NL)

(72) Inventor: Josef Bueter, Haren/Altenberge (DE)

(73) Assignee: Bümach Engineering International B.V., Ta Emmen (NL)

( * ) Notice: Subject to any disclaimer, the term of this patent is extended or adjusted under 35 U.S.C. 154(b) by 0 days.

(21) Appl. No.: 18/835,116

(22) PCT Filed: Feb. 4, 2022

(86) PCT No.: PCT/DE2022/000011
§ 371 (c)(1),
(2) Date: Aug. 1, 2024

(87) PCT Pub. No.: WO2023/147797
PCT Pub. Date: Aug. 10, 2023

(65) Prior Publication Data

US 2025/0137473 A1 May 1, 2025

(51) Int. Cl.
*F15B 15/14* (2006.01)
*F15B 15/24* (2006.01)
(Continued)

(52) U.S. Cl.
CPC ........ *F15B 15/1452* (2013.01); *F15B 15/149* (2013.01); *F15B 15/24* (2013.01);
(Continued)

(58) Field of Classification Search
CPC .... F15B 15/28; F15B 15/149; F15B 15/1452; F15B 15/24; F16J 15/164; F16J 15/3404
See application file for complete search history.

(56) References Cited

U.S. PATENT DOCUMENTS 3,311,026 A 3/1967 Crisp
3,832,852 A * 9/1974 Schmucker ........... F15B 11/205 92/61

(Continued)

FOREIGN PATENT DOCUMENTS

AT 387440 B * 1/1989 .......... F16C 33/1075
DE 1279908 B 10/1968

(Continued)

OTHER PUBLICATIONS

DE102005035633A1 machine translation thereof (Year: 2006).*
AT 387440 B machine translation (Year: 1989).*
DE7535535U machine translation (Year: 1977).*

*Primary Examiner* — Matthew Wiblin
(74) *Attorney, Agent, or Firm* — Laurence A. Greenberg; Werner H. Stemer; Ralph E. Locher

(57) ABSTRACT

A working cylinder with pressure medium overflow. A piston has a first inner annular groove with a seal and a second inner annular groove with a piston ring that has a ring gap. The seal has an axial motion clearance. A tube inner wall has a recess axially disposed such that when the piston is at a first closure part, the recess is positioned opposite the seal. The working cylinder has an overflow and a lifting operating state. In the overflow operating state, the piston is in an end position at the first closure part with the seal is positioned, in an end clearance position of the axial movement clearance thereof and an overflow cross-section between a radial limit of the seal and the recess is open and an overflow channel is open. In the lifting operating state, the seal is positioned, in a proximal end clearance position opposite and the overflow cross-section and channel are closed.

2 Claims, 5 Drawing Sheets

(51) Int. Cl.
*F15B 15/28* (2006.01)
*F16J 15/16* (2006.01)
*F16J 15/34* (2006.01)

(52) U.S. Cl.
CPC ............. *F15B 15/28* (2013.01); *F16J 15/164* (2013.01); *F16J 15/3404* (2013.01)

(56) References Cited

U.S. PATENT DOCUMENTS

| | | | | | |
|---|---|---|---|---|---|
| 4,423,664 | A * | 1/1984 | Buchl | F15B 15/24 91/1 |
| 2015/0226239 | A1* | 8/2015 | Wilmot | B60R 21/38 91/5 |
| 2023/0392617 | A1* | 12/2023 | Bueter | F16J 9/14 |

FOREIGN PATENT DOCUMENTS

| | | | | | |
|---|---|---|---|---|---|
| DE | 2245129 | A1 | | 3/1974 | |
| DE | 7535535 | U | * | 4/1977 | F04B 21/04 |
| DE | 3013381 | C2 | | 7/1986 | |
| DE | 8324442 | U1 | | 9/1989 | |
| DE | 19710448 | A1 | | 10/1997 | |
| DE | 102005035633 | A1 | | 3/2006 | |
| DE | 102005008070 | A1 | | 8/2006 | |
| DE | 202013001260 | U1 | | 5/2014 | |
| EP | 2956678 | A1 | | 12/2015 | |
| EP | 3610160 | B1 | | 5/2021 | |
| SE | 441117 | B | | 9/1985 | |
| WO | 2014124624 | A1 | | 8/2014 | |

* cited by examiner

WORKING CYLINDER WITH PRESSURE MEDIUM OVERFLOW

FIELD AND BACKGROUND OF THE INVENTION

The invention relates to a double-acting hydraulic working cylinder with pressure medium overflow between the working chambers in preferably both end positions of the piston.

According to the state of the art, solutions are known which permit the overflow of the pressure medium in working cylinders in one or both end positions of the piston. These solutions are based on the requirement to transfer pressure medium from one pressure chamber to the other pressure chamber in certain applications, such as master-slave systems or systems with hydraulic accumulators, for example, to compensate for leakage flow losses or to provide pressure equalization.

For example, valve systems which are arranged in the piston of working cylinders and are equipped with spring-loaded valve bodies including a tappet are known in the prior art. In a stroke position of the piston, the valve bodies are unactuated and closed. When the piston reaches an end position, the respective valve will be opened by the tappet which comes into pressure contact with the inside of a closure part of the cylinder tube and actuates the valve body in such a manner that the pressure medium can flow from the pressurized working chamber into the other working chamber.

The publication DE 30 13 381 C2 describes one of such solutions. In this disclosure, two valves actuated by tappets are arranged in the working piston and each is opened shortly before the respective end stop of the piston at a closure part of the cylinder tube is triggered to open to connect the working chamber with the return connection in order to prevent damage to the components.

DE 83 24 442 U1 describes the arrangement of a non-return valve in the piston and an internal connecting line in the piston and the piston rod of a double-acting piston-cylinder unit for pressure equalization with a hydraulic accumulator. The hydraulic accumulator charge and the pressure medium loss equalization between the piston chamber and piston rod chamber take place in the retracted end position of the piston when pressure is applied by a pressure medium via the main connection of the working cylinder.

In the publication DE 12 79 908 A, a double-acting hydraulic lifting cylinder with valve spindles protruding out of both sides of the piston is disclosed. The valve spindles have different lengths so that a two-stage pressure equalization between the working chambers is achieved when the respective end position of the piston is reached.

A further arrangement of a tappet-controlled valve in the piston of a working cylinder is disclosed in publication DE 2 245 129 A. Close to the end positions of the piston, the respective tappet being in contact with the inner wall of the closure part opens the valve, both working chambers of the working cylinder are connected to each other so that the pressure equalization takes place by the overflow of the pressure medium.

The subject of publication DE 10 2005 008 070 A1 is a hydraulic cylinder the piston of which has a valve arrangement for pressure equalization between the working chambers. The valves are also opened close to the end positions of the piston with the aid of tappets so that pressure medium can overflow between the working chambers of the hydraulic cylinder.

All the above-mentioned valve arrangements in the piston of a working cylinder have symmetrically designed valve arrangements that use tappets to lift the spring-loaded valve bodies out of their seats shortly before the piston reaches the respective end position so that a connection between the working chambers is established and the pressure medium is allowed to overflow for the purpose of pressure equalization.

The design-related complexity and the relatively small cross section for the overflow of the pressure medium as well as the installation space available for the valve components due to the spatial conditions in the piston limit the possible range of application of the solutions described.

The publication EP 3 610 160 B1 describes a new solution, worked out by Bümach Engineering International B.V. and provided with a double-acting overflow valve, which enables a precise adjustment of the overflow cross section.

SUMMARY OF THE INVENTION

The task of the invention is to develop a favourable solution in terms of construction which allows a definable pressure medium overflow between the working chambers of a double-acting hydraulic working cylinder in definable positions, in particular in the end positions of the piston, and features high operational reliability and low wear.

The task is solved by the features described in the independent claim. Preferred embodiments result from the sub-claims.

The working cylinder with pressure medium overflow according to the invention has a cylinder tube, a first and a second closure part, an interior, a first and a second working chamber, a first and a second pressure medium connection and a piston unit.

It is a working cylinder that, driven by a pressure flow, provides a linear movement of a piston unit. Preferably, the working cylinder is designed as a hydraulic cylinder. It can be a differential working cylinder in particular, but also a synchronized cylinder or a cylinder of another design.

The interior of the working cylinder is formed by the cylinder tube and the two closure parts. Depending on the operating state, the pressure medium is led into or out of the cylinder via two pressure medium connections. The first pressure medium connection is assigned to the first working chamber and the second pressure medium connection is assigned to the second working chamber. The pressure medium connections provide external connection options, in particular for hydraulic hoses or hydraulic lines.

The piston unit consists of a piston and a piston rod, which are connected to each other in a form-fit or force-fit manner in a longitudinal axis. The piston unit can also have a monolithic design. The piston is arranged in the interior and moves along the longitudinal axis of the cylinder. The longitudinal axis divides the interior into the first working chamber and the second working chamber. The piston rod of the piston unit passes through the closure part, which is designed as a guide closure part, and offers the possibility of force transmission to components outside the interior.

On its outer lateral surface, which is the sliding surface to the inner lateral surface of the cylinder tube, the piston has a circumferential first inner ring (annular) groove. A seal, which is arranged in this first inner ring groove and rests against an inner cylinder wall of the cylinder tube, separates the first working chamber from the second working chamber and seals them against each other.

The piston unit performs the stroke movements as a result of the alternating flow and flow of the pressure medium in or out of the working chambers, wherein the seal also keeps the working chambers separated during the stroke movement by sliding against the inner wall of the cylinder tube.

According to the invention, the working cylinder with pressure medium overflow is characterized in particular by the features described below.

According to the invention, the seal in the first inner ring groove has an axial movement clearance. This means that it can assume different axial positions in the first inner ring groove which are defined by the width of said groove.

Furthermore, the piston has a circumferential second inner ring groove and a piston ring arranged therein. This piston ring rests resiliently against the inner wall of the cylinder tube. According to the invention, the piston ring has a piston ring gap so that the piston ring gap forms an opening cross section.

According to the invention, the cylinder tube also has a recess in the inner wall of the cylinder tube, which is arranged axially such that it is positioned opposite the first inner ring groove in an end position of the piston at the first closure part. The recess can preferably be a simple bore hole of shallow depth. Other designs such as keyways, semi-circular grooves, spiral grooves or other concave geometries are also possible. The recess is always designed and positioned in such a manner that, when the first inner ring groove is positioned exactly opposite to it, depending on the axial position of the seal which in turn depends on the movement clearance, it provides an opening cross section for the pressure medium which is subsequently referred to as the overflow cross section.

In addition, the working cylinder is designed for an overflow operating state and for a stroke operating state.

In the overflow operating state, the piston is positioned axially in an end position at the first closure part. In the overflow operating state, this is the stroke end position of the stroke actuated by the second working chamber.

In the overflow operating state, the seal is positioned, by pressurization of the second working chamber, in an end position of its axial movement clearance that is in the direction of the first closure part. As a result, an overflow cross section is created that is opened between a radial limit of the seal and the recess. Furthermore, an overflow channel is formed from the second pressure medium connection via the second working chamber, via the overflow cross section and the piston ring gap, along the first working chamber up to the first pressure medium connection. The present invention covers any serial arrangement of the overflow cross section and the piston ring gap, irrespective of whether the pressure medium in the overflow channel first flows through the overflow cross section and then through the piston ring gap or vice versa.

According to an essential feature of the invention, the piston ring gap forms a throttle cross section for the pressure medium in the overflow cross section and thus relieves the seal at the overflow cross section.

In the stroke operating state, the piston is out of the stroke end position. In the stroke operating state, pressure is applied to the first working chamber. The seal is positioned, by pressurization of the first working chamber, in a proximal clearance end position opposite the distal clearance end position. The overflow cross section and thus the overflow channel are closed. As a result, a complete seal is already achieved in the stroke start position and a movement out of the stroke start position without loss of pressure flow is made possible.

Due to the overflow of the pressure medium in the stroke end position of the piston and in combination with the defined ring gap of the piston ring, a limited pressure medium overflow is provided.

The advantage of this is that the pressure in the entire hydraulic system does not increase abruptly up to the maximum hydraulic pressure when the end position is reached so that the entire system is relieved.

Another advantage is given by the fact that the flow conditions at the overflow cross section are relieved by the piston ring gap that is serially acting as a throttle. Firstly, the comparatively sensitive seal, which forms a section of the walls of the overflow cross section, is directly protected so that it is subject to considerably less wear than it would be the case if the overflow cross section itself had to provide the throttling effect. Secondly, the pressure fluctuations and shear stresses of the pressure medium are reduced when the pressure medium overflows the overflow cross section.

This design has the particular advantage of avoiding the diesel effect which is possibly caused in the state of the art. In the case of the diesel effect, air-oil aerosol formed in bubbles is compressed by high pressure peaks and often in interaction with cavitations in the pressure medium in such a way that the oil particles in the bubbles are subject to self-ignition and burn due to overheating. The negative effects include, apart from premature ageing of the pressure medium, possible damage to the hydraulic system itself.

In the present invention, such an effect is ruled out thanks to the pressure-relieving overflow possibility of the pressure medium. In addition, the wear of all system components through which the pressure medium flows is minimized.

Advantageously, it can be guaranteed that all cylinders reach the end position even for arrangements consisting of several parallel working cylinders of the same size. The slightly reduced speed of movement of the working cylinders connected in parallel caused by fading, friction, manufacturing tolerances or other disturbance impacts can be compensated for by the overflow and all cylinders reach the end position.

Furthermore, the working cylinder with pressure medium overflow according to the invention can also be used as a master cylinder in a master-slave arrangement and as such ensure the proper operation of the master cylinder and the slave cylinder.

According to an advantageous further development of the working cylinder with pressure medium overflow the cylinder tube has a further recess in the inner wall of the cylinder tube. This recess is arranged axially such that the recess at the second closure part is positioned opposite the first inner ring groove in an end position of the piston. Thus, the working cylinder is designed for a further overflow operating state and for a further stroke operating state. In the further overflow operating state, the piston is positioned in an end position at the second closure part. The seal is positioned, by pressurization of the first working chamber, in a clearance end position of its axial movement clearance that is distal in the direction of the second closure part. A further overflow cross section is opened between the radial limit of the seal and the further recess. This results in a further overflow channel that is opened from the first pressure medium connection via the first working chamber, further via the further overflow cross section and the piston ring gap, via the second working chamber up to the second pressure medium connection.

In the further stroke operating state, the seal is positioned, by pressurization of the second working chamber, in a further proximal clearance end position opposite the further distal clearance end position. The further overflow cross section and the further overflow channel are closed in this process In the present application, the position designations distal and proximal are used in dependence of the operating state. The term distal refers to the direction axially outwards as viewed from the respective end position.

According to this further development, the working cylinder has the advantage of enabling an overflow in both end positions due to the further recess in the inner wall of the cylinder tube in the opposite end position. The contents of the description of the overflow operating state apply to the further overflow operating state and the contents of the description of the stroke operating state apply to the further stroke operating state in a corresponding manner.

In this way, the advantages of the overflow of the pressure medium can be utilized both in the extended and retracted piston positions. In particular, the parallel extension and retraction of several parallel cylinders or cylinders in master-slave arrangements are thus guaranteed until the end position of all cylinders is reached.

According to another advantageous further development of the working cylinder with pressure medium overflow according to one of the preceding claims, this one is characterized in that a cross section of the piston ring gap is smaller than the overflow cross section or the further overflow cross section.

The load on the seal in use caused by the pressure of the pressure medium can thus be minimized. The pressure limitation achieved by the defined ring gap of the piston ring relieves the seal, as the pressure medium is only sheared to a small extent when overflowing the seal. Due to the low shear, the friction and the change in temperature are minimized when the seal is flowed over. This in turn leads to an increased service life of the seal and guarantees a consistent overflow behaviour. Any higher loads due to the throttling effect at the piston ring gap on the piston ring are harmless because the seal is a robust component. Advantageously, the flow rate can be adjusted very precisely and in a structurally simple manner by means of the piston ring gap.

In particular, a low flow rate required for the switching valves can be provided. This low rate may be necessary to trigger the switching process for hydraulically actuated switching valves. In this way, a reliable switching process of the valves is ensured thanks to the controlled pressure medium overflow.

According to another advantageous further development of the working cylinder with pressure medium overflow according to one of the preceding claims, this one is characterized in that the recess or the further recess is designed as a cold-formed embossing section.

In order to optimize the machining effort for the cylinder tube during production and to make it more cost-effective, the recess can be provided as a cold-formed embossing. This solution also has the advantage that chips or a production burr, which could cause damage to the seal during operation, do not remain in the cylinder tube. In addition, the service life of the seal is increased according to this further development. The additional compression of the material structure at the reduced cross section at the recess can maintain a constant strength of the cylinder tube. Advantageously, outer surfaces or jackets of the cylinder tube with a correspondingly lower thickness can be used. According to this further development, any allowances that otherwise had to be provided due to weakening by a machined recess can be advantageously omitted.

BRIEF DESCRIPTION OF THE FIGURES

The invention is explained in more detail as an exemplary embodiment by means of the following figures. They show.

Here, the same reference numerals in the various figures refer to the same features or components. The reference numerals will also be used in the description, if they are not shown in the relevant figure.

DETAILED DESCRIPTION OF THE INVENTION

Figure 1:
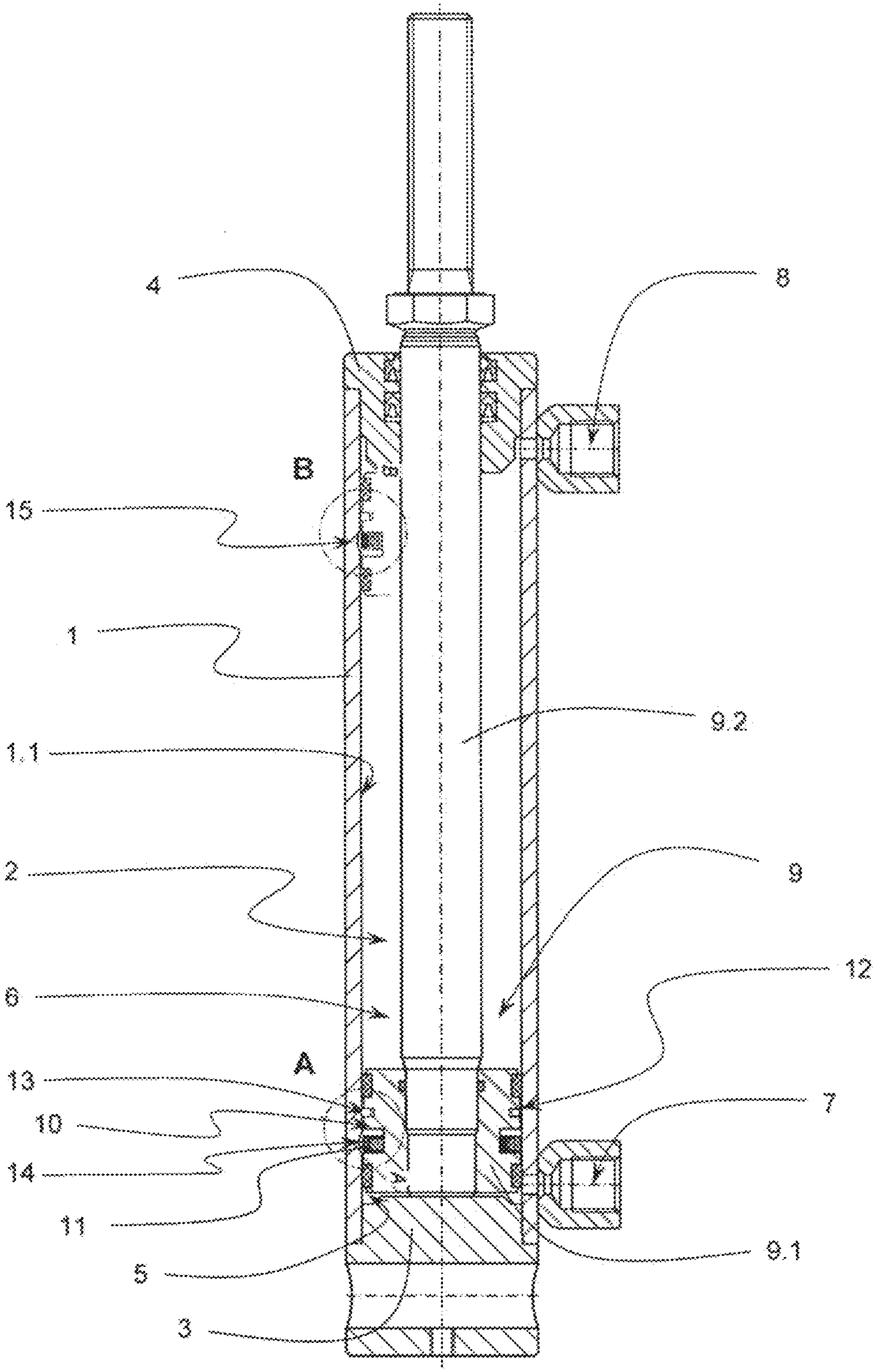
FIG. 1 Schematic sectional view of the working cylinder with pressure medium overflow.

FIG. 1 shows an exemplary working cylinder with pressure medium overflow in a schematic sectional view. The present exemplary embodiment is an advantageous further development of the working cylinder in which overflow is possible in both end positions.

The working cylinder is shown with the cylinder tube 1, which—axially limited by the two closure parts 3, 4 at each side—forms an interior 2. In the exemplary embodiment, the first closure part 3 is designed as a base closure part and the second closure part 4 is designed as a guide closure part.

The piston unit 9 consists of the piston rod 9.2 and the piston 9.1. The piston 9.1 is supported in such a manner that it can move linearly in the interior 2. The piston 9.1 divides the interior 2 of the working cylinder into two working chambers 5, 6 into which the pressure medium flows or in which it is displaced, depending on the stroke direction. The two working chambers 5, 6 are separated from each other by a seal 11. The pressure medium flows into or out of the respective working chamber 5, 6 through the corresponding pressure medium connection 7, 8 assigned to the working chamber 5, 6. The first pressure medium connection 7 is assigned to the first working chamber 5, which is the piston chamber in this case, and the second pressure medium connection 8 is assigned to the second working chamber, which is the piston rod chamber in this case.

The seal 11 is arranged in the first inner ring groove 10 of the piston 9.1 and is designed as an O-ring here which is made of an elastomer. The axial width of the first inner ring groove 10 is greater than the width of the seal 11 so that the seal 11 is moveable in the axial direction.

Furthermore, the piston 9.1 has a second inner ring groove 12. A piston ring 13 is mounted in this groove. The piston ring 13 has a piston ring gap 13.1 providing an overflow possibility for the pressure medium.

In the end section of the cylinder tube 1, which faces the first closure part 3, the recesses 14 are located in the inner wall of the cylinder tube 1.1. The other recess 15 is provided at the opposite end section of the cylinder tube, which is assigned to the second closure part 4. Depending on the direction of movement of the piston 9.1, the positioning of the seal 11 opposite the recess 14 or the further recess 15 provides an overflow possibility for the pressure medium at the end of the stroke.

Figure 2:
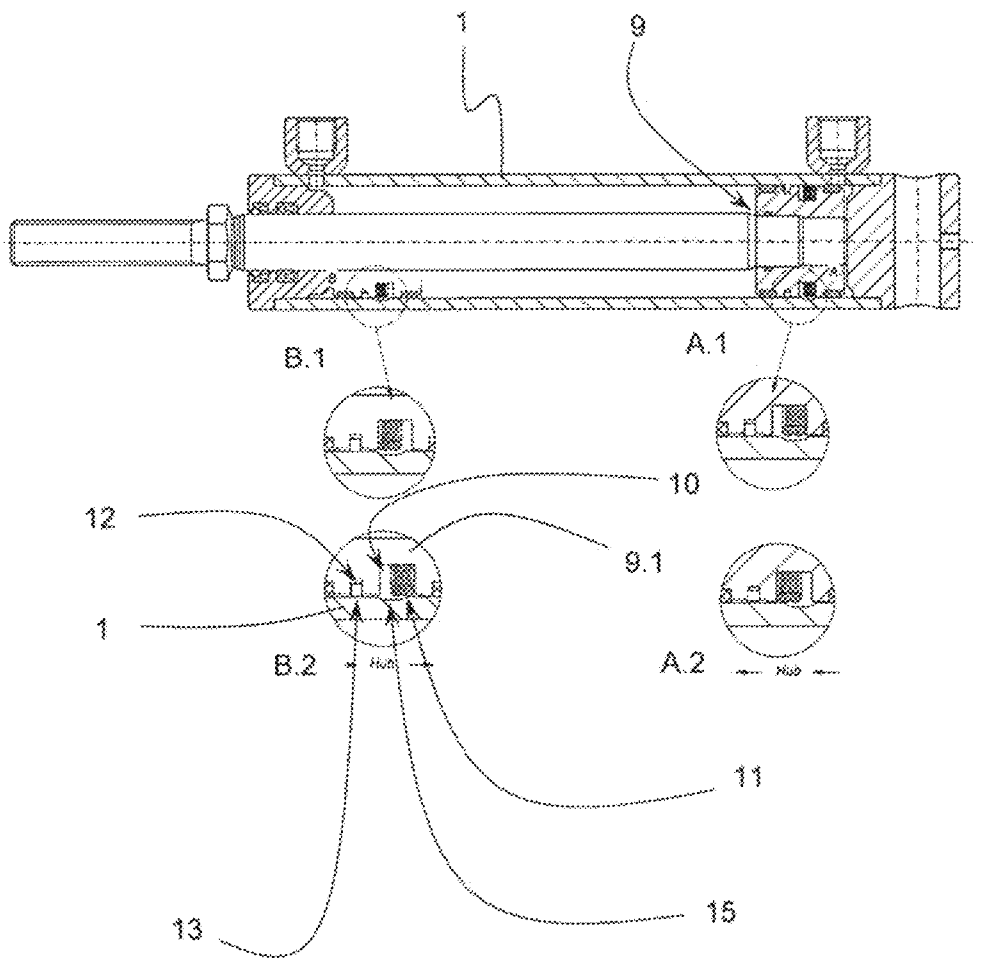
FIG. 2 Schematic representation of the operating states.

FIG. 2 shows the different operating states of the working cylinder in a schematic image sequence. The assignment of the enlarged sections, labelled A and B, is simultaneously shown.

When the piston is moved to an end position, the seal 11 moves over the recess 14, 15 in the inner wall of the cylinder tube 1.1. As a result, the pressure medium is given the opportunity to flow between the two working chambers 5, 6 via the recess 14, 15. If the inflow direction of the pressure medium changes such that the stroke movement of the working cylinder is reversed, the seal 11 is relocated in the first inner ring groove 10. As a result, the outer radial limit of the seal 11 rests again in a circumferential manner at the inner wall 1.1 of the cylinder tube and the working chambers 5, 6 are again sealed against each other. The stroke movement of the piston 9.1 is continued up to the next end position without pressure medium overflow.

Figure 3:
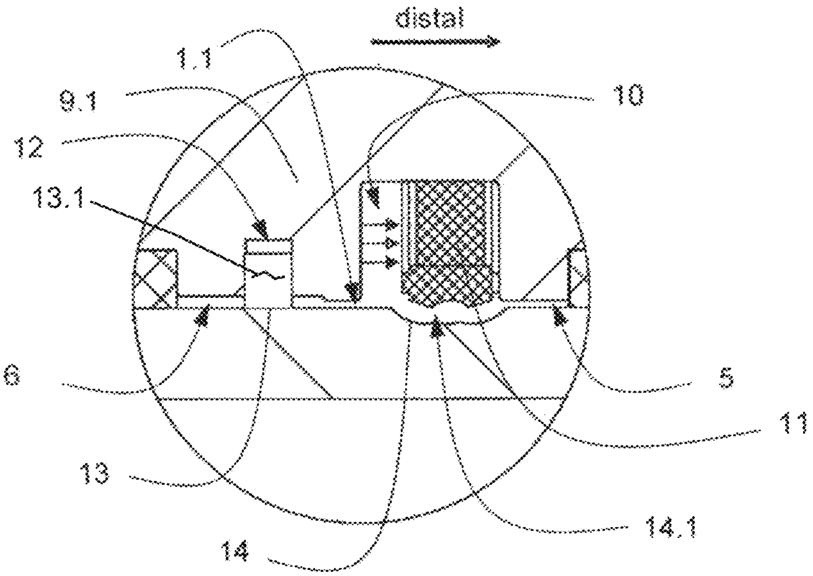
FIG. 3 Schematic sectional view as a detailed view in the overflow operating state—detail A.1.
Figure 4:
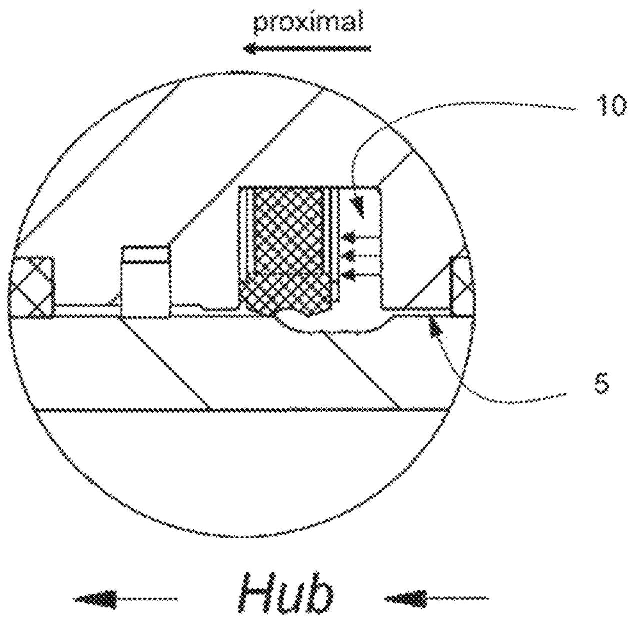
FIG. 4 Schematic sectional view as a detailed view in the stroke operating state—detail A.2.
Figure 5:
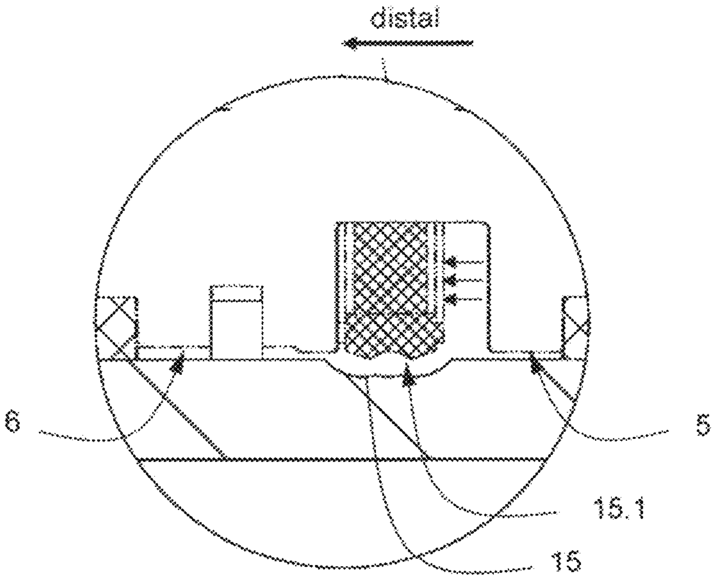
FIG. 5 Schematic sectional view as a detailed view in the further overflow operating state—detail B.1.

This process is illustrated in detail by means of the FIGS. 3 to 6 in schematic sectional views of a section of the piston 9.1 and the inner wall of the cylinder tube 1.1 in the area of the piston ring 13 and the seal 11 above the respective recess 14, 15. FIGS. 3 and 4 refer to the stroke end position at the first closure part 3, and FIGS. 5 and 6 refer to the further stroke end position at the second closure part 4. FIGS. 3 and 5 show the two overflow operating states. FIGS. 4 and show, at their respective start, the two stroke operating states.

FIG. 3 shows the working cylinder in the overflow operating state in detail A.1. The piston 9.1 is in the end position at the first closure part 3. The seal 11 is supported such that it is axially moveable in the first inner ring groove 10. Due to the excess pressure in the second working chamber 6, the seal 11 rests against the distal side wall of the first inner ring groove 10 in the direction of the first closure part 3 at the distal end position. In FIGS. 3 to 6, the excess pressure is illustrated by the three parallel arrows in the free movement space of the first inner ring groove 10.

The pressure medium can flow into the first working chamber 5 via the piston ring gap 13.1 of the piston ring 13 and subsequently via the overflow cross section 14.1, which has formed radially between the seal 11 and the recess 14. This represents the overflow channel. The pressure medium is throttled by the defined cross section of the piston ring gap 13.1 and the seal 11 is relieved.

FIG. 4 shows the stroke operating state in detail A.2. Here, the stroke operating state is at its start. The piston 9.1 is still in the end position at the first closure part 3. Pressure medium flows through the first pressure medium connection 7 into the first working chamber 5. The excess pressure moves the seal 11 axially in the direction of the second closure part 4 and presses it against the proximal side wall of the first inner ring groove 10. As a result, the outer radial limit of the seal 11 is not longer positioned directly axially opposite the recess 14 but it rests again, at least in sections, against the inner wall of the cylinder tube 1.1. Therefore, the two working chambers 5, 6 are again separated from each other in a sealing manner and the stroke can be performed without overflow.

FIG. 5 shows the working cylinder in the further overflow operating state in detail B.1. The piston 9.1 is in the end position at the second closure part 4. Due to the excess pressure in the first working chamber 5, the seal 11 rests against the distal side wall of the first inner ring groove 10 in the direction of the second closure part 4 at the distal clearance end position. The seal is axially opposite the further recess 15 so that the outer radial limit does not longer reach the cylinder inner wall in a circumferential manner there and the further overflow cross section 15.1 is formed.

The pressure medium can flow from the first working chamber 5 into the second working chamber 6 via the further overflow cross section 15.1, which has formed radially between the seal 11 and the further recess 15, and subsequently via the piston ring gap 13.1 of the piston ring 13. This represents the further overflow channel. Even with this reverse overflow direction, the pressure medium is throttled by the defined cross section of the piston ring gap 13.1 and the seal 11 is relieved.

Figure 6:
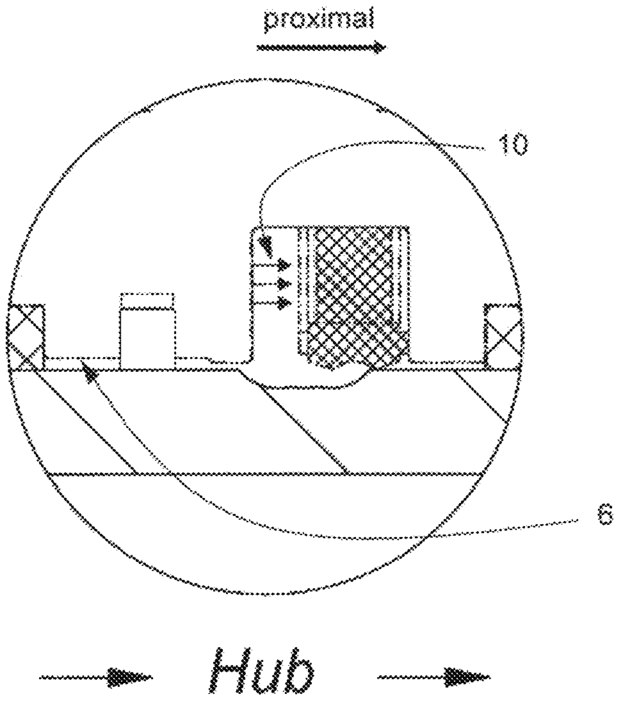
FIG. 6 Schematic sectional view as a detailed view in the further stroke operating state—detail B.2.
Figure 7:
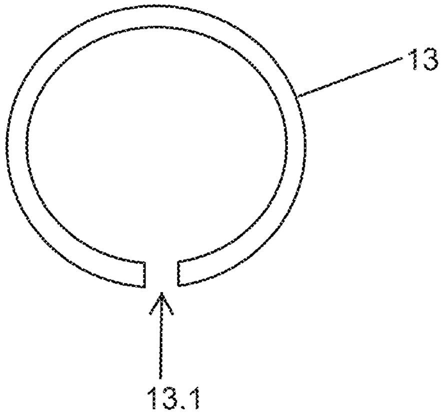
FIG. 7 Diagrammatic plan view of a piston ring with a piston ring gap.

FIG. 6 shows the further stroke operating state in detail B.2. Here, the further stroke operating state is at its start. The piston 9.1 is still in the end position at the second closure part 4. Pressure medium flows into the first working chamber 6 through the second pressure medium connection 8. Due to the excess pressure, the seal 11 is moved axially in the direction of the first closure part 3 and pressed against the proximal side wall of the first inner ring groove 10. As a result, the outer radial limit of the seal 11 does not longer rest directly axially opposite the further recess 15, but at least in sections again at the inner wall of the cylinder tube 1.1. As a result, the two working chambers 5, 6 are again separated from each other in a sealing manner and the stroke can be executed without overflow.

LIST OF REFERENCE NUMERALS

1 Cylinder tube
1.1 Inner wall of the cylinder tube
2 Interior
3 First closure part
4 Second closure part
5 First working chamber
6 Second working chamber
7 First pressure medium connection
8 Second pressure medium connection
9 Piston unit
9.1 Piston
9.2 Piston rod
10 First inner ring groove
11 Seal
12 Second inner ring groove
13 Piston ring
13.1 Piston ring gap
14 Recess
14.1 Overflow cross section
15 Further recess
15.1 Further overflow cross section

The invention claimed is:

1. A working cylinder with pressure medium overflow, comprising:

a cylinder tube with an inner wall and a first and a second closure part defining an interior, said cylinder tube having a first and a second pressure medium connection;

a piston unit having a piston and a piston rod, said piston being arranged in said interior and defining a first and second working chamber, said first pressure medium connection being assigned to said first working chamber and said second pressure medium connection being assigned to said second working chamber, said piston having a circumferential first inner ring groove and a seal arranged in said first inner ring groove resting against said inner wall and separating said first and the second working chambers from each another, said seal having an axial movement clearance in said first inner ring groove;

said piston having a circumferential second inner ring groove with a piston ring arranged therein, said piston ring resting resiliently against said inner wall and having a piston ring gap defined by spaced apart ends of a circumferential break in said piston ring;

said cylinder tube having a recess in said inner wall arranged axially positioned opposite said first inner ring groove in an end position of said piston at said first closure part, said cylinder tube having a further recess in said inner wall arranged axially positioned opposite said first inner ring groove in a second end position of said piston at said second closure part, the working cylinder being constructed for an overflow operating state and a stroke operating state, in the overflow operating state:

said piston being positioned in the end position at said first closure part, said seal being positioned in a distal clearance end position of an axial movement thereof in a direction of said first closure part by pressurization of said second working chamber for opening an overflow cross section between a radial limit of said seal and said recess, and an overflow channel being opened from said second pressure medium connection via said second working chamber, said overflow cross section, said piston ring gap and said first working chamber up to said first pressure medium connection; and in the stroke operating state:

said seal being positioned in a proximal clearance end position opposite the distal clearance end position by pressurization of said first working chamber closing said overflow cross section and said overflow channel;

wherein the working cylinder is constructed for a further overflow operating state and a further stroke operating state, in the further overflow operating state:

said piston is positioned in said second end position, said seal is positioned in a second distal clearance end position of an axial movement thereof in a direction of said second closure part by pressurization of said first working chamber, and a further overflow cross section is opened between the radial limit of said seal and said further recess, and a further overflow channel is opened from said first pressure medium connection up to said second pressure medium connection via said first working chamber, said further overflow cross section, said piston ring gap and said second working chamber;

in the further stroke operating state:

said seal is positioned in a second proximal clearance end position opposite said second distal clearance end position by pressurization of said second working chamber to close said further overflow cross section and said further overflow channel;

wherein a cross section of the piston ring gap is smaller than said overflow cross section or said further overflow cross section.

2. The working cylinder with pressure medium overflow according to claim 1, wherein said recess or said further recess is constructed as a cold-formed embossed section.

* * * * *